Dec. 2, 1969  T. A. HENDRICKSON ET AL  3,481,195
RECORD CARD MACHINE

Filed June 21, 1965  9 Sheets-Sheet 1

INVENTORS
THOMAS A. HENDRICKSON
WILLIAM L. STAHL

BY Douglas R. McKechnie
ATTORNEY

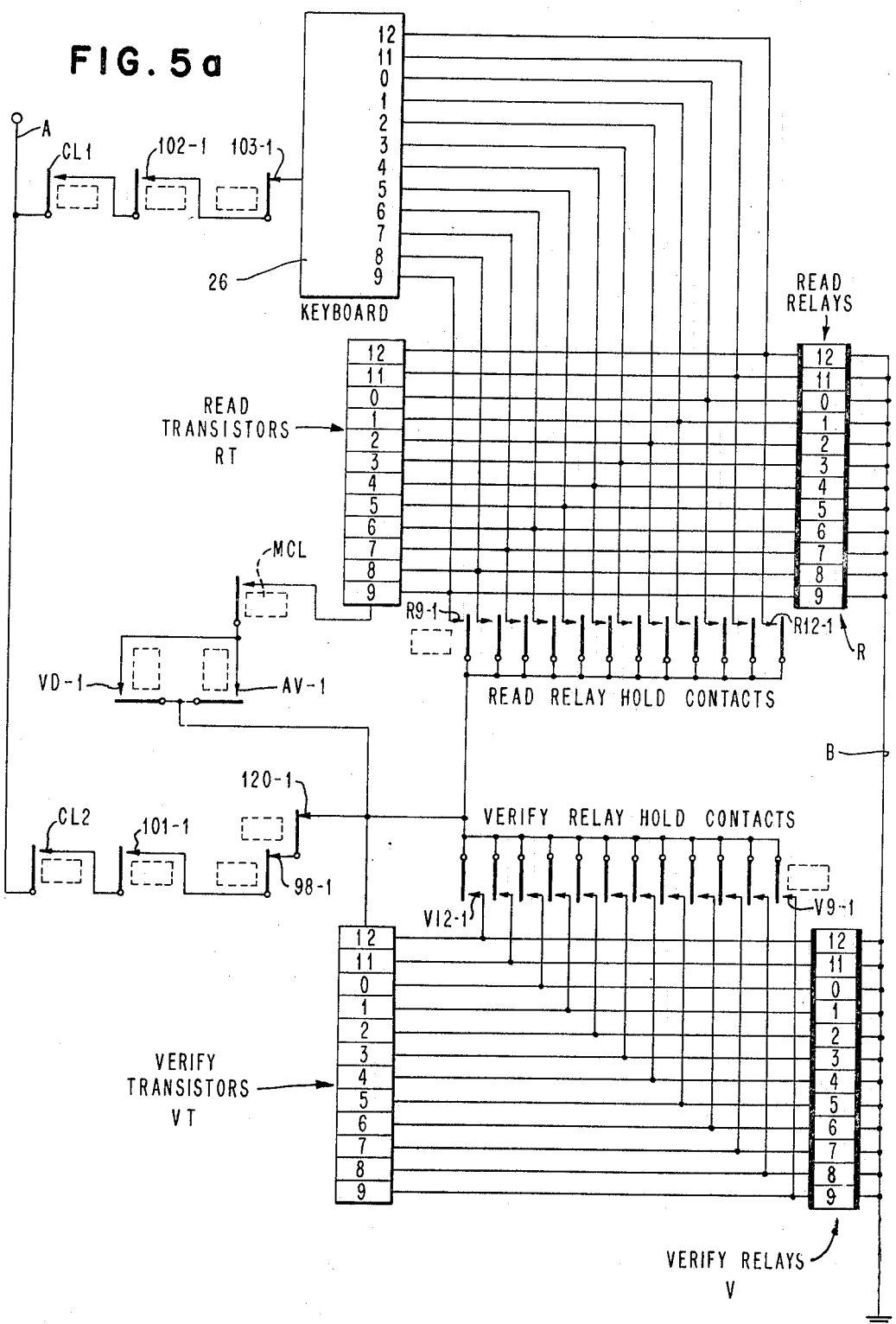

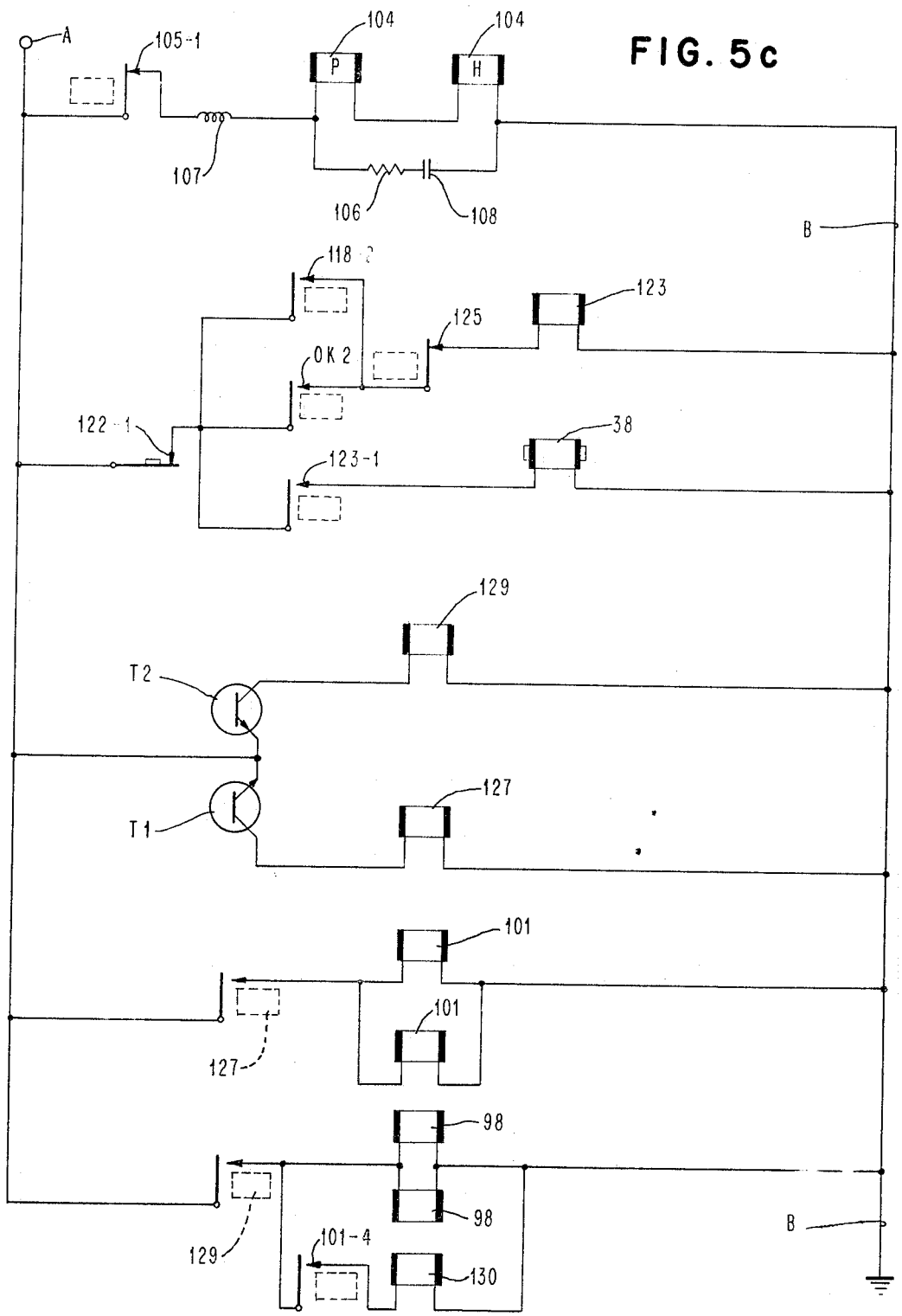

United States Patent Office 3,481,195
Patented Dec. 2, 1969

3,481,195
RECORD CARD MACHINE
Thomas A. Hendrickson, Poughkeepsie, and William L. Stahl, Fishkill, N.Y., assignors to International Business Machines Corporation, Armonk, N.Y., a corporation of New York
Filed June 21, 1965, Ser. No. 465,258
Int. Cl. G01b 5/16
U.S. Cl. 73—156        14 Claims

ABSTRACT OF THE DISCLOSURE

A record card verifier has an improved optical sensing and timing system, program control system and component mounting arrangement. The optical sensing and timing system includes fiber optic bundles for transmission of light from a single source to a verify station, a read station and an emitter wheel. At each station phototransistors sense the punched holes in cards and the emitter wheel permits phototransistors to produce timing and control pulses. In the program control system, star wheel contacts provide programmed control of the verifier, i.e., initiation and hold functions, and a contact operated circuit is provided in parallel with one star wheel contact to prevent premature interruption of automatic machine functions. The mounting arrangement includes a resilient mounting for the card handling mechanism and the flexible fiber optic bundles permit isolation of the light source from vibrations.

---

This invention relates to improvements in record card machines of the type in which punched cards are moved under program or keyboard control through one or more functional stations for carrying out the functions of the machine.

More specifically, the invention relates to improvements in the sensing and timing systems of record card machines known as card verifiers, or simply verifiers, wherein punched cards are moved under both program and keyboard control through a verify station and a read station and the correctness of the presence and absence of holes in specific areas of each card is ascertained. The particular machine which the invention improves notches a peripheral or marginal portion of each card to signify the correctness or the incorrectness of the data in the card. When the punched holes are properly located, the card is notched at one end whereas when the card contains an error in one of its columns, the edge of the card is notched above the column in error. The machine further comprises a punched hole sensing mechanism having sensing pins that are raised and lowered to electrically detect the presence or absence of holes in the rows of each card. During such sensing, a card must be held stationary and therefore the advancement of cards through the verifiers is in an incremental or intermittent fashion. Because such mechanisms utilize mechanical elements and require that the cards be held stationary while sensing occurs, such verifiers are relatively slow and require considerable adjustment and maintenance. Accordingly, one of the objects of the invention is to provide a verifier which uses a conventional card transport or handling mechanism but which verifies at substantially higher rates than those which were heretofore obtainable with the above-mentioned prior art machines.

Another object is to provide a verifier that is quiet and fast and requires relatively little maintenance.

Still another object is to provide an optical sensing and timing system for a verifier that allows verification to be accomplished while the cards are moving either incrementally or continuously through the verifier.

A further object is to provide an electro-optical timing and sensing system for a record card machine, which is unaffected by the hole-no hole light ratio of light transmitted through a card and provides a high signal to noise ratio.

A still further object is to provide an optical sensing system wherein light is projected through holes in a card to cause actuation of relays, the system including means for maintaining the relays actuated and for de-energizing the relays independent of the intensity of the light transmitted through the card.

Another object is to provide a verifier having an optical system that utilizes a single light source for activating several phototransistors located at different stations.

Still another object is to provide optical system having a single light source mounted so as to be substantially free from vibrations so as to possess a relatively long life.

Another object is to provide an optical timing and sensing system, for a record card machine, having a high intensity light source which activates many phototransistors without transmitting thereto an appreciable amount of heat which might otherwise decrease the stability and life expectancy of the phototransistors.

In accordance with another of its aspects, the invention also improves program control systems of the type comprising a star wheel sensing device that senses control holes in a program card mounted on a program drum moved in synchronism with movement of the punched cards through the record card machine. As is known, a program can be determined by various holes punched in specific rows of a program card of a type containing eighty columns each divided into twelve rows. In one arrangement, a program is determined by using six rows, such as the 12, 11, 0, 1, 2 and 3 rows of a conventional record card. Normally the 11-3 rows, in the above sequence, are used to initiate programmed functions at a particular column and the 12 row is used to define a field and continue the particular function for as many successive columns as contain 12 holes.

The above-mentioned star wheel sensing device employs a plurality of star wheels each associated with a different row, the particular star wheel being known by the associated row, such as the 12 star wheel, 11 star wheel, etc. The star wheels are mounted on levers and operate by riding along the surface of a card until a hole is encountered whereupon a point of the star wheel drops into the hole and the lever pivots to close contacts associated therewith. As will be appreciated, such star wheel sensing devices require accurate and precise adjustment for correct operation. This is particularly true of the 12 star wheel which establishes the field definition since, when a 12 star wheel is out of adjustment, its contacts might bounce as the 12 star wheel moves from hole to hole and thereby open electric circuits and prematurely interrupt the function which the field definition star wheel contacts are supposed to hold. Thus, another object of the invention is to provide a program controlled record card machine employing a star wheel sensing device wherein the field definition star wheel need not be as critically adjusted as in the prior art devices and whereby contact bounce of the field definition star wheel contacts will not interrupt whatever function is being held thereby.

The foregoing and other objects, features and advantages of the invention will be apparent from the following description of a preferred embodiment of the invention, taken in connection with the accompanying drawings wherein:

FIGS. 5a–5f are schematic wiring diagrams wherein the various switches and contacts are shown in their normal positions.

Figure 1:
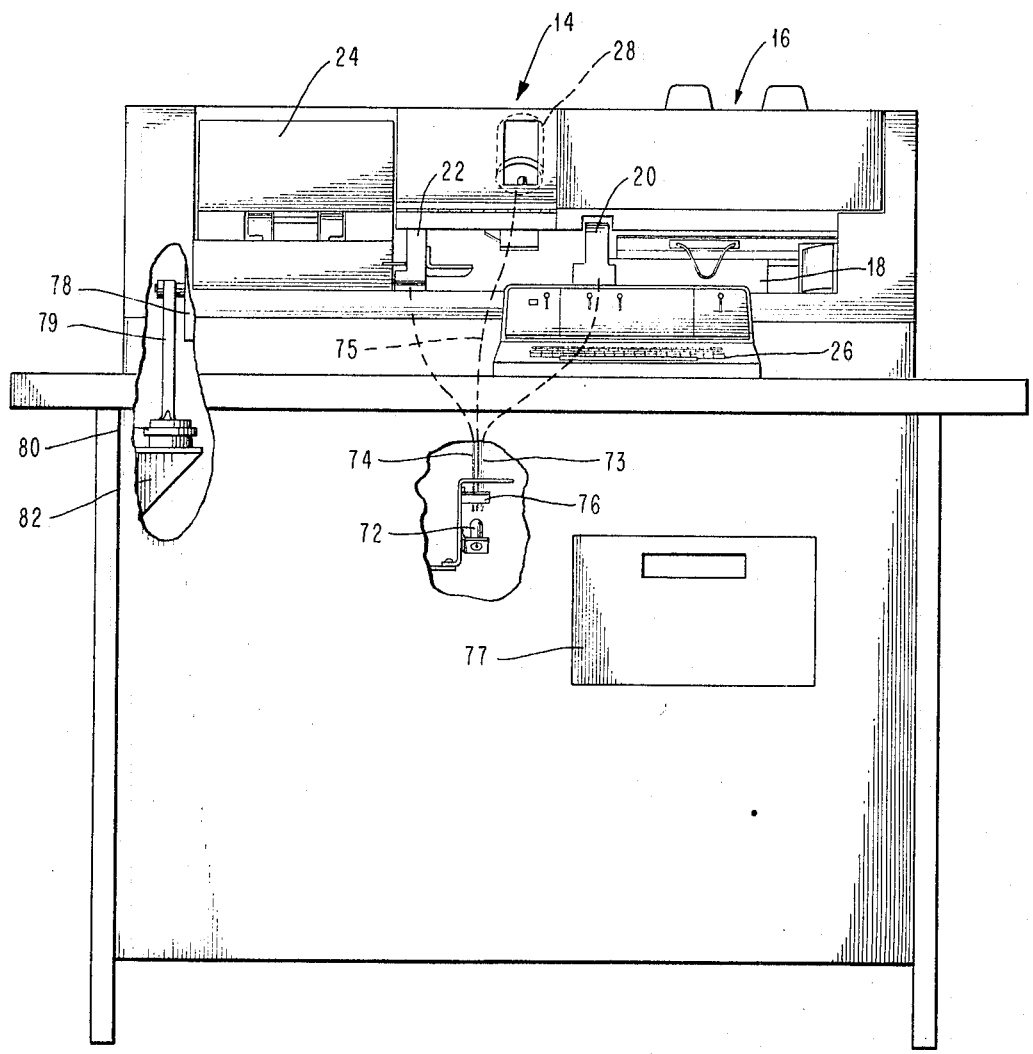
FIG. 1 is a front elevational view, with portions broken away, of a verifier embodying the invention.

Referring now to the drawings, the invention is illustrated as embodied in a verifier 14 having a cover design similar to that shown in U.S. Design Patent 197,334, Bixler et al. Verifier 14 includes many conventional elements and mechanisms and only those which have been modified and are necessary to understand the invention will be described. Verifier 14 comprises a frame, a card handling mechanism, a notching mechanism, a program drum and a star wheel sensing device similar to those of the well-known "IBM 56 Card Verifier," these elements being described in numerous publications such as U.S. Patent 2,615,333, Gardinor et al., and the copywrited publication "IBM Customer Engineering Manual of Instruction for 56 Card Verifier." However, these elements have been modified as explained below. Verifier 14 further includes the new optical timing and sensing system and associated electrical control circuitry described below.

GENERAL FEATURES

The card handling mechanism of verifier 14 comprises a card hopper 16 in which the cards to be verified are stored and from which the cards are fed, one at a time, along a transport bed 18. Spaced along bed 18 are a verify station 20 and a read station 22 to which the cards are transported or moved under the control of a keyboard 26 or a program drum 28. From the read station, cards pass through an eject station and thence into a card stacker 24. A card fed from hopper 16 is first preregistered and then registered at verify station 20. Afterwards it is registered at read station 22. While passing through the verify station a card is known as a detail card and while passing through the read station a card is known as a master card from which information can be read and compared or verified with that on a detail card. Thus, each card is verified while at station 20 by a comparison of the data sensed therefrom to data manually keyed in from a keyboard 26 or to data sensed from a master card at station 22. This manner of operation, as briefly described above, may be seen in greater detail by referring, for example, to such available sources as the copywrited publication "IBM Field Engineering Theory of Operation for 59 Card Verifier" and the above-referred to "IBM Customer Engineer Manual of Instruction for 56 Card Verifier." Relative to the prior art card handling mechanisms, the mechanism of verifier 14 is modified by suitable adjustment of the card registration devices so that both the master and detail cards are registered in the same columns at both the read and verify stations. Verifier 14 includes a conventional notching mechanism (not shown) at read station 22, aligned one column after the column being verified.

Keyboard 26 is conventional and contains various switches for controlling operation of the verifier and various keys for controlling functions of the verifier and for keying information or original data to verify the detail card. The keyboard is of a type which, upon depressing a key to enter alphanumeric data or special character information, "locks up" and must be restored by operation of conventional keyboard restore magnets, in order to allow the operator to proceed with keying.

Figure 2:
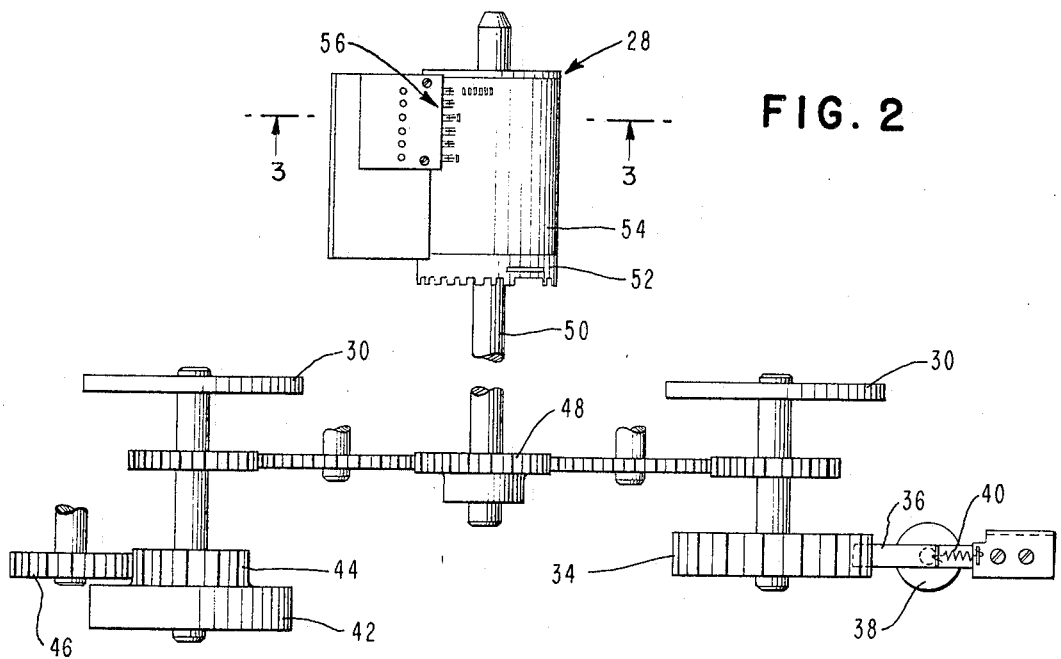
FIG. 2 is a schematic plan view of the escapement mechanism.

With reference to FIG. 2, the master and detail cards are moved or transportated through the read and verify stations by means of the escapement mechanism shown in this figure. This escapement mechanism is old except that it has been modified to include, as one of the elements driven thereby, an emitter wheel 52 more fully discussed below. The escapement mechanism includes a pair of friction feed rolls 30 which engage the underside of the cards, when the cards are registered in the stations, and cooperate with conventional pressure rolls (not shown) to move cards along bed 18 in response to rotation of the feed rolls. An escape wheel 34 has a plurality or ratchet teeth engaged by an escapement armature 36 when the solenoid or escape magnet 38 associated therewith is de-energized. Upon energizing escape magnet 38, armature 36 is attracted so as to disengage the teeth of escape wheel 34 allowing the escapement mechanism to advance the cards. When escape magnet 38 is de-energized, a return spring 40 moves the armature against escape wheel 34. Feed rolls 30 and escape wheel 34 are connected through suitable gears to the output shaft of a friction clutch 42. A continuously rotating driving gear 46 is engaged with the input gear 44 of friction clutch 42 to frictionally bias the escapement mechanism in conventional fashion. When armature 36 engages escape wheel 34, the escapement mechanism is prevented from escaping, and when the armature is disengaged from escape wheel 34, friction clutch 42 rotates the escapement mechanism causing feed rolls 30 to advance the cards engaged therewith. The armature is either intermittently operated to allow the escape wheel to escape one tooth at a time and move a card at a rate of fifty columns per second, or it is operated to permit the escape wheel to escape more than one tooth, such as by continuous energization of escape magnet 38, and move a card at a rate of eighty columns per second.

The escapement mechanism further includes a gear 48 that drives the program drum shaft 50 upon which program drum 28 is detachably mounted. Also mounted on program drum shaft 50, in fixed relationship thereto, is emitter wheel 52 that rotates in synchronism with the escapement mechanism and program drum and thereby moves in synchronism with movement of the cards through the stations. Program drum 28 detachably supports a program card 54 which, when the verifier is operating under program rather than manual control, controls the automatic operations of the machine. Since the verifier 14 can operate automatically under program control to perform such operations as automatic skipping of fields, for the purpose of illustrating the invention, program card 54 utilizes rows 12 through 3 thereof to define a program. The particular program illustrated in FIG. 2 may use for example, 0 and 3 holes in a column at the start of a field wherein high-speed auto-verification (i.e., 80 columns per second) is to be performed to provide that field definition and it may use 12 holes in successive columns to define the length of the field and thereby hold such function. This operation is explained further hereinafter.

Figure 3:
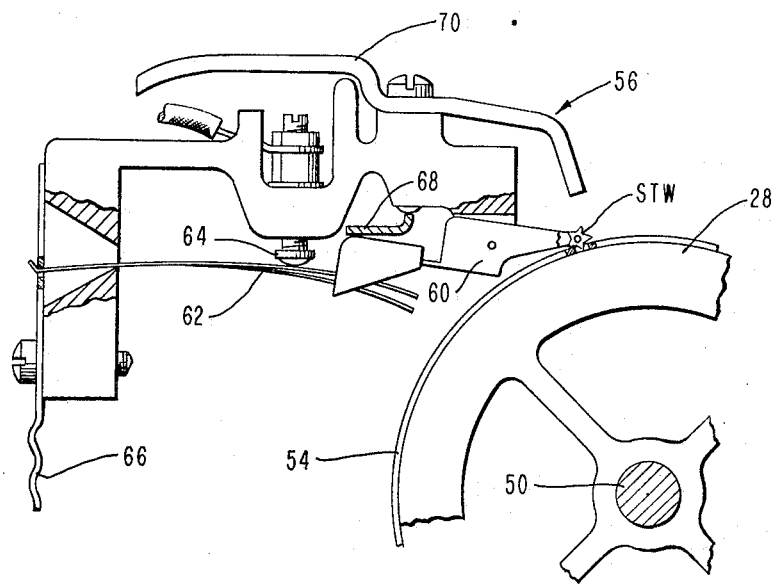
FIG. 3 is a transverse view through the program drum and star wheel sensing device.

Mounted adjacent to program drum 28 is a star wheel sensing device 56 of modified conventional construction. Device 56 includes one star wheel STW for each row of control holes in program card 54, device 56 being controlled by a program handle or switch 58 (FIG. 5e) that is used to move the star wheels into and out of engagement with the program card and to establish the necessary electrical connections for program control. As best seen in FIG. 3, each star wheel STW is rotatably mounted on one end of a sensing arm lever 60. The other end of arm 60 is connected to spring wire contacts 62, which, when the star wheel falls into a punched hole in card 54, contacts a contactor 64 and electrically connects it to a common plate 66. The illustrated device also includes a conventional release bail 68 and star wheel aligning plate 70. Device 56 is modified relative to the prior art by providing a star wheel sensing arm 60 that positions the 12 star wheel STW12 one-half of a card column ahead of the functional star wheels to thereby operate in accordance with the timing sequence described hereafter.

In order to decrease the noise level of the verifier, the base assembly 78 thereof, upon which the stacker 24, hopper 16, the driving elements and motors, etc., are mounted, is supported by legs 79 that are connected through rubber block connectors 80 to stand 82 so as to resiliently suspend the base assembly 78 and minimize the transmission of vibration into stand 82. That is, stand 82 is relatively stationary whereas the base assembly 78 and parts mounted thereon, are subject to vibration due to the moving parts of the mechanism.

OPTICAL SYSTEM

Verifier 14 comprises a high intensity light source such as a projection lamp 72 arranged to direct its high intensity light beam onto the input ends of three fiber optic bundles 73, 74 and 75. Lamp 72 is mounted on stand 82, and the adjacent ends of bundles 73–75 are held by a bracket 76 that permits the ends to be shifted relative to the light beam to thereby vary the intensity of the light conducted through the bundles. Fiber optic bundles 73–75 comprise elongated, incoherently oriented, flexible glass fibers threaded through the verifier from the light source to the verify and read stations and to emitter wheel 52, respectively.

Figure 4:
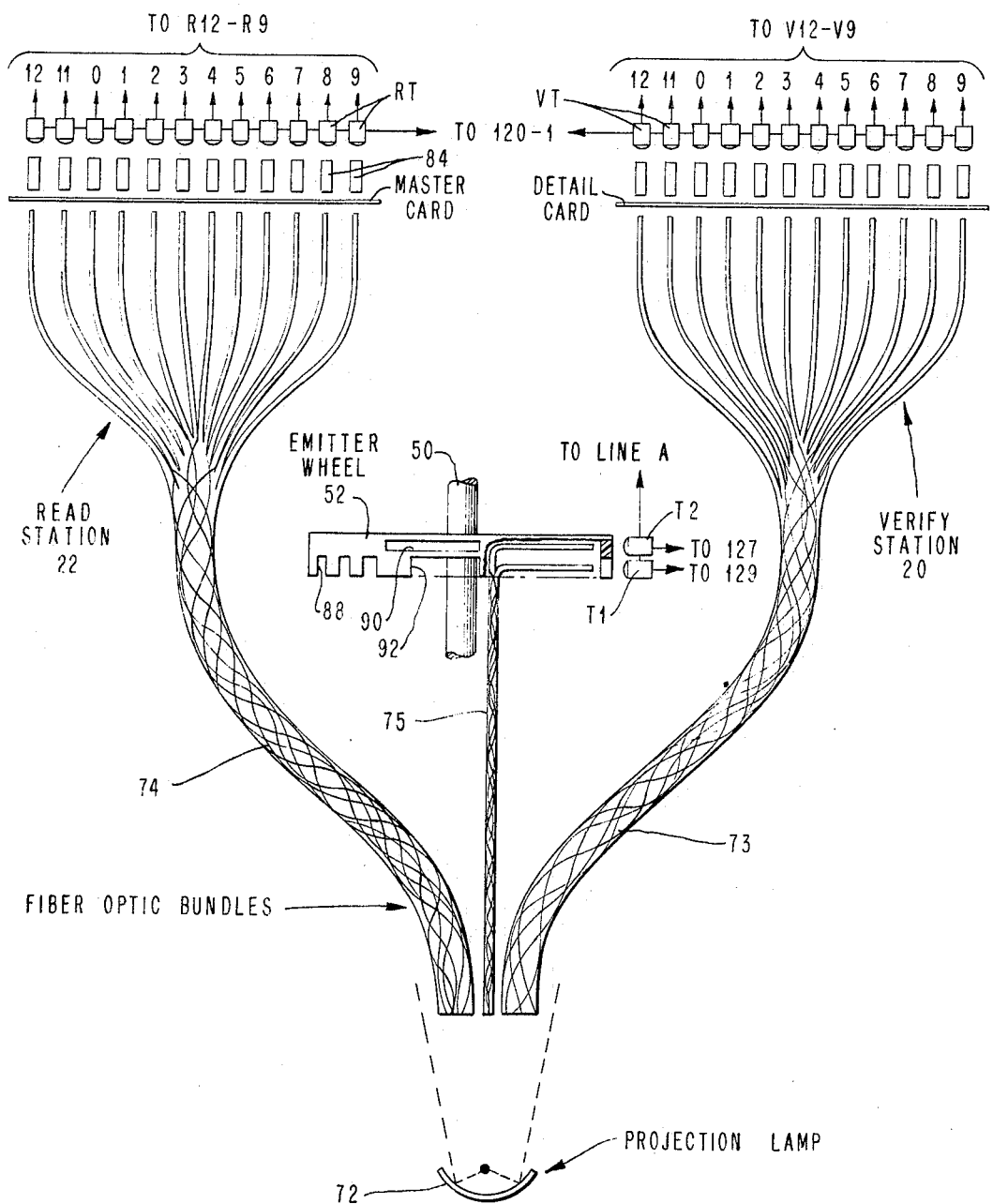
FIG. 4 is a schematic view of the optical system of the invention.

As shown in FIG. 4, the output end of each bundle 73 and 74 is divided into twelve portions oriented to direct the light emerging therefrom upwardly and into light pipes 84. These light pipes in turn direct the light conducted thereby onto verify and read phototransistors VT12–VT9 and RT12–RT9. At each station, the ends of the bundles, light pipes 84 and the associated phototransistors generally lie in a plane that extends across the path of movement of the punched cards in alignment with the card rows in order to sense the punched holes of each card on a column-by-column basis. The punched cards pass between the adjacent ends of the bundles and of light pipes 84. The diameter of each end portion of each bundle is approximately one-half the width of the conventional punched holes so that all of the light emergent therefrom can freely pass through a punched hole. The light pipes 84 are of larger diameters and are so axially displaced from the output ends as to receive all of the light emergent therefrom, to provide a high efficiency light transmission system.

The output end of bundle 75 is divided into two portions which direct emergent light outwardly towards the inner wall of emitter wheel 52 and towards phototransistors T1 and T2. Emitter wheel 52 is of an opaque material and has a plurality of short slots 88 and a long slot 92 for controlling the light received by T1 and a long slot 90 for controlling the light received by T2, from bundle 75. The number of slots 88 correspond to the number of columns in a card and these slots are used to produce or emit timing or control pulses. Slots 90 and 92 are used to control between card functions similar to the manner of the well known program cams and contacts of the aforementioned "IBM 56 Card Verifier," but without the attendant maintenance and adjustments.

Emitter wheel 52 is so positioned relative to program drum shaft 50 that the slots 88 are aligned with and centered relative to the columns on the program card 54 and the master and detail cards, and slots 90 and 92 extend through the column 80⅓ to 88¼ and 82½ to 88¼ of the program drum, respectively or between the eightieth and the first columns of the eighty column program card, so that rotation of wheel 52, which occurs in synchronism with movement of cards through the verifier, produces timing and control pulses more fully described below.

WIRING DIAGRAM—FIGS. 5a–5f

The wiring diagram is a simplified illustration showing schematically those elements essential to an understanding of the invention as explained by the operation of a simple verifier under both keyboard and program control. This diagram does not purport to show all of the circuitry that would be included in this type of a verifier, and it will be understood that many functions and relays, diodes, components, etc. which are well-known and in practice would be involved in the operation of such a machine, are omitted from the present specification. The operation of the verifier and the wiring diagram will be explained with reference to verifying under three modes: keying data; comparing master and detail cards under keyboard control; and comparing master and detail cards automatically at high speed under program control. The first two modes involve moving the cards incrementally through the stations whereas the latter mode, known as automatic high speed verification, involves moving the cards in continuous fashion through the stations.

Verifier 14 includes a conventional switch and power supply (not shown) which supplies electric power to a negative power line A and a ground line B that extend along the left and right hand edges of the wiring diagram. The various operating circuits extend between these lines. In the diagram, the switches and contacts are shown in their normal condition. Verifier 14 preferably uses reed relays because of their fast operating times, low power requirements and quietness of operation. In the diagram, in a relay having only a single set of points or contacts, both the relay and contacts are designated by the same reference character whereas, with relays having more than one set of contacts, the operating coil or coils is indicated by a reference character and the sets of contacts are differentiated by numerical suffixes. In some cases, more than one relay coil may be shown, but the coils are treated as being a single relay for simplicity of description.

Verifier 14 includes a conventional card lever (not shown) actuated by a detail card for energizing a card lever relay CL to condition various circuits that depend, for their operation, upon the presence of a detail card. Relay CL has normally open contacts CL1–CL7 which will be assumed closed, unless otherwise indicated, throughout the following description since the invention will be explained with reference to what is done while a detail card is at the verify station.

Referring now to FIG. 5a, the emitters of verify phototransistors VT12–VT9 are connected to common and the collectors are connected respectively to verify relays V12–V9. The commoned emitters are connected to line A through the series-connected contacts CL2, 101–1, 98–1 and 120–1. Twelve verify relay hold contacts VL12–1 through V9–1 are connected in parallel each with a different one of the verify phototransistors, VT12–VT9. While a card is being verified and so long as an error has not been detected, contacts 101–1 of emitter relay 101 control operations of VT12–VT9 and V12–V9. When contacts 101–1 close, each VT is biased, between its collector and emitter, whereby only light of at least the intensity of the light that passes through a punched hole activates the VT to generate sufficient current to pick the associated relay. That is, each verify relay is picked upon activation of the associated phototransistor by that light from bundle 73 which passes through a punched hole in the associated row. When a relay is picked, the associated hold contacts, upon closing, short circuit the associated phototransistor, and establish a hold path that is independent of the light level that activates the associated phototransistor. When emitter contacts 101–1 subsequently open, any relays V, which are being held are dropped and the short circuiting is removed from VT. In other words, the verify phototransistor sensors are used to pick the verify relays directly without the need of additional amplification, and a timing pulse, i.e. the opening of emitter contacts 101–1, drops the relays.

Similarly, read relays R12–R9 are connected in series with the collectors of read transistors RT12–RT9 having commoned emitters connected to the contacts of master card lever relay MCL and the parallel combination of contacts VD–1 or AV–1 to the common emitters of VT. Verifier 14 also includes a conventional master card lever (not shown) that is actuated by a master card to actuate MCL and thereby condition the read station for reading from a master card. Contacts VD–1 are actuated by a relay VD that is energized upon depression of a VER–DUP key on keyboard 26 (FIGURE 5b) and contacts AV–1 are actuated by programming an automatic verify relay AV. A plurality of read relay hold contacts R12–1—R9–1 are connected in parallel with read transistors RT and in series with the read relays R and act in a manner similar to the V12–1—V9–1 hold contacts to hold whatever read relays are energized so long as the emitter relay 101 is energized.

While the read transistors RT provide one means for energizing the read relays R, the verifier also includes a circuit whereby keyboard 26 can be used to energize the read relays, the keyboard being generally connected in parallel with the rear transistors and provided with the necessary interlock to prevent operation of both at the same time. More specifically, keyboard 26 is connected in series with contacts CL1 and with contacts 102–1 of a relay 102 that is energized only so long as the functions which require the use of the read transistors are not being performed, as more fully pointed out hereafter. Keyboard 26 is also in series with contacts 103–1 of a high speed error relay 103 that is energized if an error occurs during high speed verification. As previously indicated keyboard 26 is conventional and provides a coded output that is fed to relays R12–R9 to energize selective ones in accordance with the code and the particular key that has been depressed. In the manner previously pointed out, once a read relay is energized, it is held through its associated hold contact.

Figure 5B:
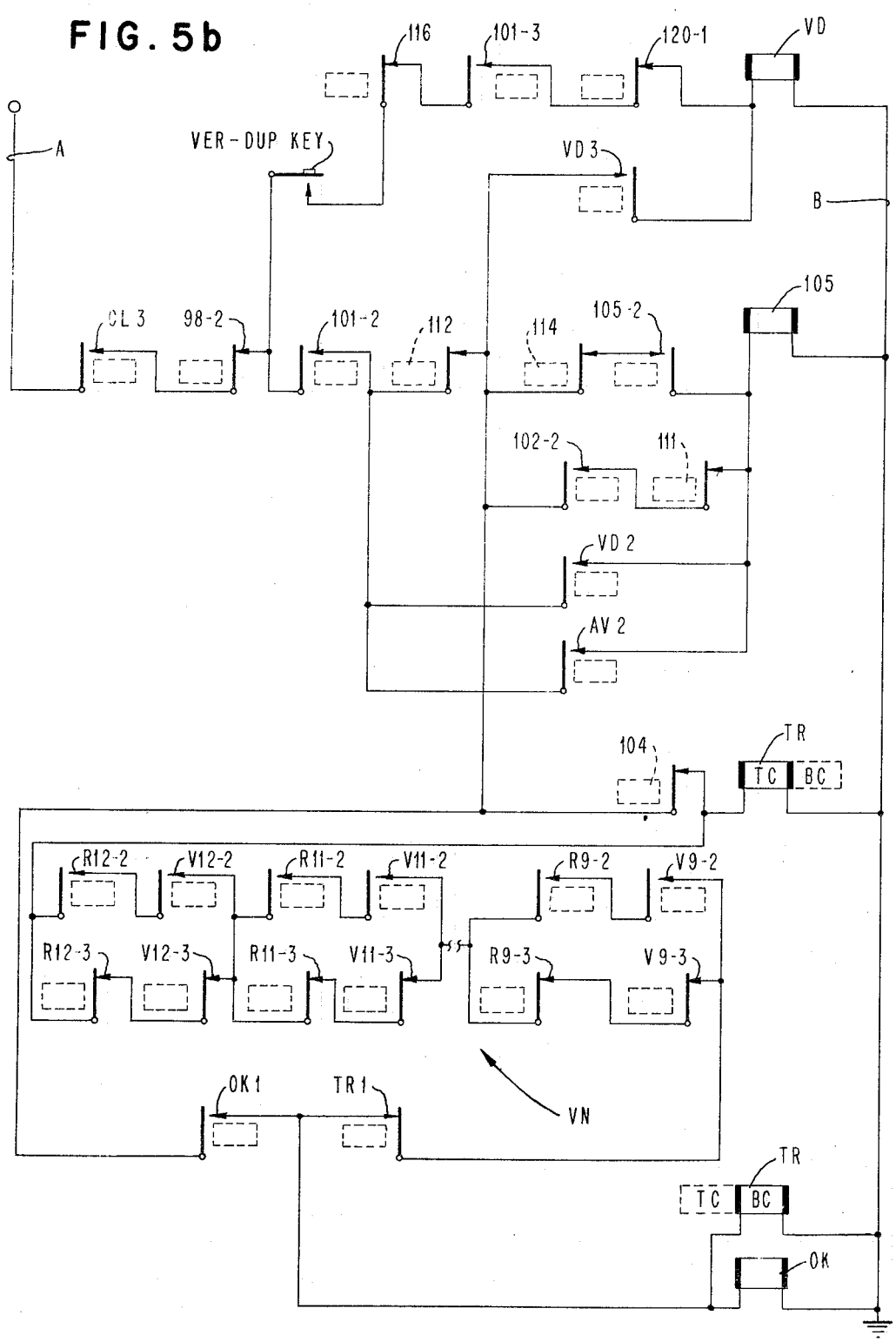

As shown in FIG. 5b, each one of the read and verify relays has a set of normally open and normally closed contacts designated R12–2 and R12–3, V12–2 and V12–3, etc. The contacts are arranged in series parallel fashion to form a verify network VN whose function is to energize the bucking coil BC of a test relay TR and to pick an OK relay when the data being verified are correct or to prevent energization thereof when the data are incorrect. The verify network comprises twelve contact groups connected in series, the groups corresponding to the card rows 12–9. In each group, the normally open contacts of the read and verify relays are connected in series with each other and in parallel with the series connection of the normally closed contacts. Thus, for example, R12–2 is in series with V12–2, R12–3 is in series with V12–3, and R12–2 and V12–2 are in parallel with R12–3 and V12–3. Therefore, in order for current to flow through the VN, the relays V and R which control each group have to be in the same condition, picked or dropped. Test relay TR also includes a test coil TC wound opposite to coil BC so that when both are energized, their effects cancel each other whereby TR will not pick, and when only TC is energized, TR will pick. The test coil TC is in parallel with the series combination of VN of contact TR1 and of the parallel arrangement of the coil BC and the OK relay, and all are in series with the contacts of a delay relay 104 which controls operation of the VN.

Ok relay has hold contacts OK1 connected in parallel with VN. When delay relay 104 drops, either the OK relay is picked and held through O21 or TR picks dependent on the correctness of the data. As described more fully below, when OK relay picks, the cards are advanced and when TR picks, the card advancement is prevented and an error routine must be performed.

Operation of delay relay 104 is controlled by a sequence start relay 105 having a contact 105–1 which, as shown in FIG. 5c, is in series with the pick and hold coils of the delay relay 104. An inductor 107 is connected in series with the delay relay and a resistor 106 and capacitor 108 are connected in parallel therewith to provide a time delay, after contacts 105–1 open and before the delay relay drops, in the order of, e.g. three milliseconds, to allow the verify and read relay contacts to close free from bounce before delay relay 104 drops. The contacts of relay 104 are connected to power line A through the contact of an error reset relay 112, emitter contacts 101–2, 98–2, and CL3. Sequence start relay 105 operates under those conditions in which it is desired to verify data, and it is the relay which generally initiates the action of first verifying and then, if the data are correct, allowing the escapement mechanism to escape and advance the cards to the next column. This is in contrast to prior art machines such as the aforementioned IBM 056 Card Verifier wherein the verifier first escapes and then verifies. The present mode of operation of verifying first and then escaping is advantageous because it eliminates the various time consuming dummy cycles of the aforementioned prior art machine.

Figure 5D:
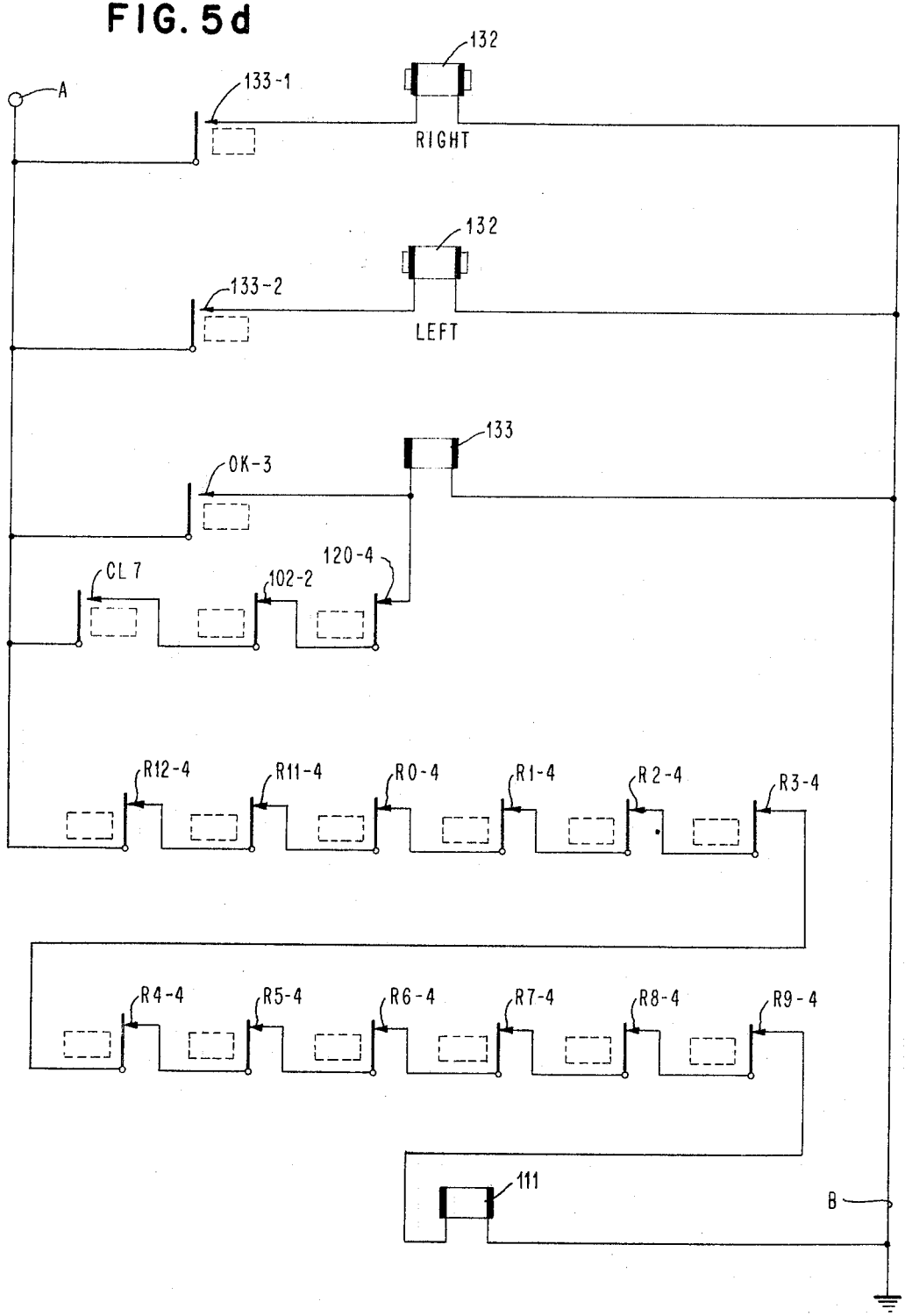

When data is being keyed, relay 105 is controlled by contacts 102–2 of manual field relay 102 and by the contacts of any character relay 111. As shown in FIG. 5d, the any character relay is connected in series with normally closed read relay contacts R12–4 through R9–4. Thus, until data is keyed in to actuate the read relays R, relay 111 is energized and its normally closed contacts are open. As previously indicated, relay 102 is energized during keying so that contacts 102–2 are closed, these contacts being in series with those of the relay 111. Thus, when a key is depressed so as to energize any of the read relays, the any character relay 111 drops causing its contacts to close and thereby pick sequence start relay 105. Once picked, sequence start relay 105 is held through its hold contacts 105–2 connected in series through the contacts of a significant digit relay 114. Relay 105 drops when emitter contacts 101–2 open. Relay 105 can also be energized through the VD2 contacts and through the AV2 contacts which are respectively energized while the VER–DUP key is depressed and during programmed auto verification.

As shown in FIG. 5b, the VER–DUP key is connected in series with contact CL3 and 98–2 to power line A and with the series combination of VER–DUP interlock relay contacts 116, of emitter contacts 101–3, of error-1 relay contacts 120–1, and of the coil of the VER–DUP relay VD. Once picked, relay VD is held through its hold contacts VD–3, error reset contacts 112 and emitter contacts 101–2 whereby operation of relay VD is controlled principally by emitter relay 101. By continuously depressing VER–DUP key, and thereby placing relay VD under the control of the emitter relay, contacts VD2 place relay 105 under the control of the emitter so that verification of a detail card continues to the end of it, or until an error is encountered, or until the key is released.

As shown in FIG. 5c, operation of escape magnet 38 is controlled by escape relay contacts 123–1 and notch drive contact 122–1. Escape relay 123 is connected in series with the notch interlock relay contacts 125 and OK–2 contacts and the notch drive contacts. Thus, once OK relay energizes as a result of a proper verification, escape relay 123 picks closing contacts 123–1 and thereby energizes the escape magnet 38 to allow the escapement mechanism to escape one column. During a one-column escapement, emitter relay 101 drops and this action drops OK relay and opens contacts OK–2 to drop relay 123 and de-energize magnet 38 so that the armature engages the next tooth and limits advancement to a single column. OK–2 contacts are connected in parallel with contacts 118–2 of the auto skip relay. During automatic skip operations, escape relay 123 is continuously energizing allowing a continuous movement of cards through the read and verify stations.

Again, with reference to FIG. 5c, it will be seen that the phototransitors T1 and T2 control operation of an emitter sense relay 127 and a PCC–1 sense relay 129 respectively, so that when light from bundle 75 activates the base of either transistor, the relay associated therewith will be picked. The contacts of the emitter sense relay 127 in turn control operation of the emitter relay 101. The contacts of relay 129 control operation of the PCC–1 relay 98 and also of a PCC–2 relay 130 which is connected through emitter contacts 101–4 to the contacts of relay 129 in parallel with the PCC–1 relays. Relays 98 and 130 control the between card functions in a manner similar to that of the prior art machine so that further elaboration thereof is unnecessary.

As previously indicated, keyboard 26 is of a type that allows operation of only one key at a time. Pressing a key causes it to "lock up" and prevent operation of any further keys until the keyboard is restored. Thus, to continue operation, keyboard 26 has to be restored each time a verification occurs, and this is accomplished through the use of the conventional keyboard restore magnets 132 shown in FIG. 5d. Keyboard restore magnets 132 are controlled by keyboard restore relay contacts 133–1 and 133–2. The keyboard restore relay picks when OK relay picks and contacts OK–3 close. Relay 133 is also controlled through contact CL7, 102–2 and 120–4, the manual field relay contacts 102–2 being closed any time an operation other than the keying, such as auto skipping, auto verification and VER–DUP, is being performed.

When test relay TR picks while verifying under keyboard control, it initiates a conventional error routine sequence which involves allowing the operator to check three times as to the cause of the error. On the third try, the verifier notches the edge of the card above the column in error and advances the card. Since this operation is conventional, it will not be described in detail.

The operation of verifier 14 under program controlled automatic high speed verification will now be explained. To prepare for program functions, program handle 58 is turned ON, FIG. 5e, and the AUTO VER and AUTO SKIP switches are turned ON after a master card is registered. The function is initiated at the desired column of a detail card by the presence of 0 and 3 holes in the corresponding column of program card 54 and the function is held by 12 holes in successive columns of the program card. The star wheel contacts are connected to line A through program handle 58 and contacts CL4, 103–3 and 98–3. Star wheel contacts STW3, STW0 close shortly before emitter relay 101 picks. When contacts STW3 and STW0 close, relays 135 and 134 are picked to prepare a pick circuit for the auto skip relay 118 that picks this relay when the emitter relay picks. The closing of contacts STW0 also prepares a pick circuit for relay AV.

When the emitter relay 101 picks, relay AV is picked through the circuit that extends thereto from STW0 and comprises contacts 137–1, 101–5 and 120–2, and relay 118 is picked by the circuit comprising contacts CL4, 101–6, relays 134 and 135, AUTO SKIP switch, 137–2, 101–7 and 120–3. When picked, relays 118 and AV close their hold contacts 118–3 and AV3 so as to be held through contacts STW12. As the program card advances from the start-of-field column, contacts STW12 close before STW0 and STW3 open, to hold relays 118 and AV after their pick circuits open and until the end of a field or the detection of an error.

Figure 5E:
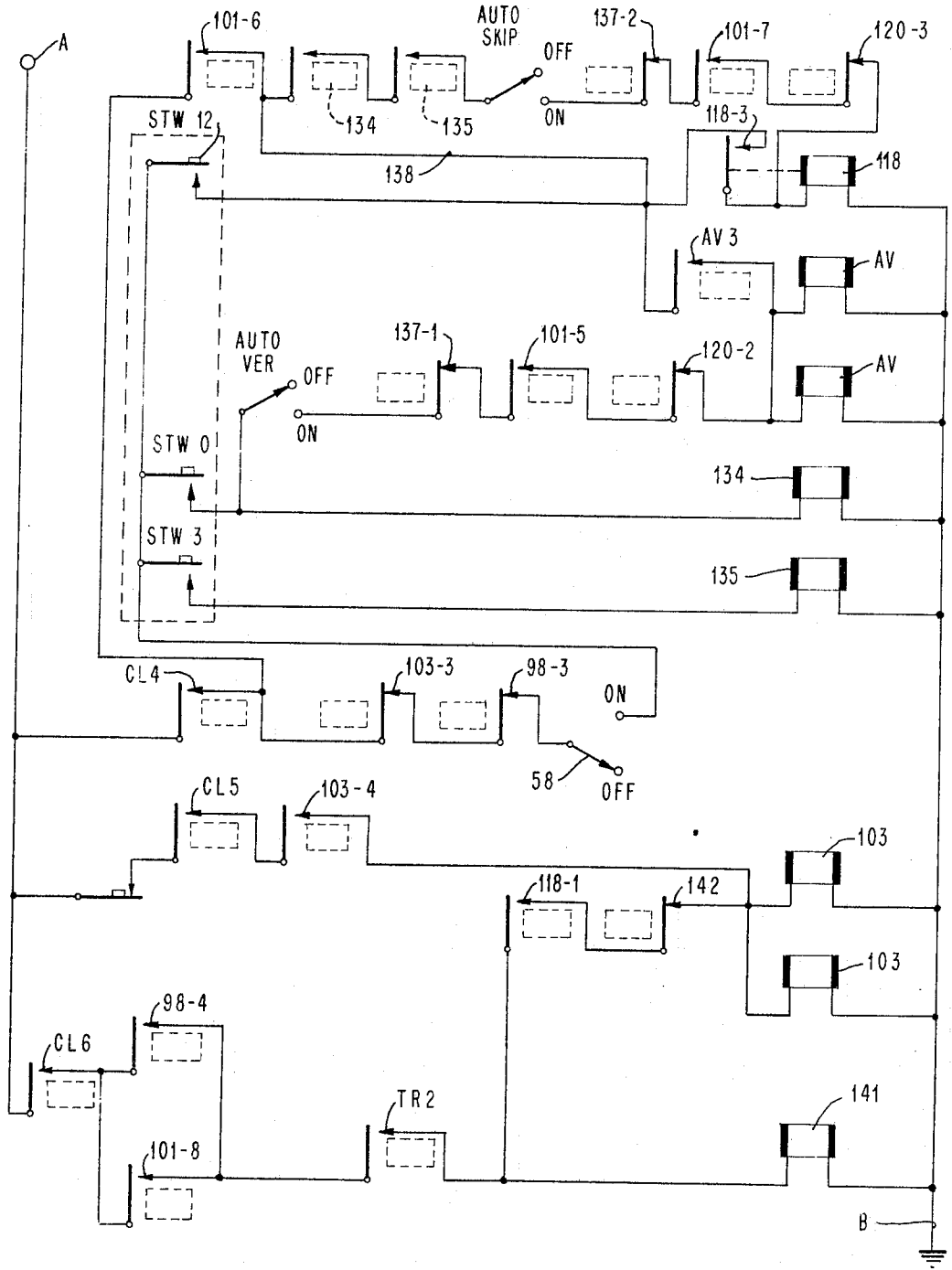
Figure 5F:
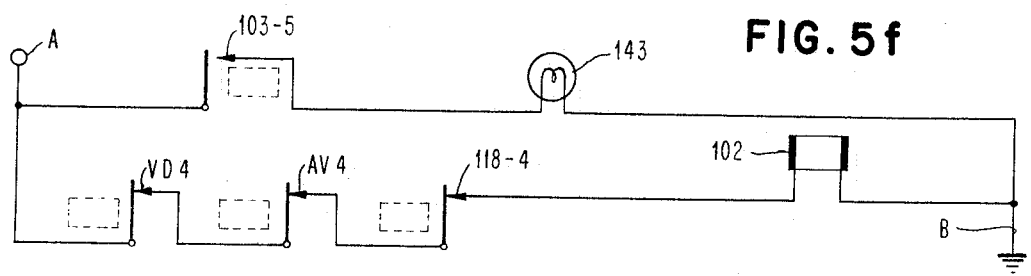

Contacts 118–2 (FIG. 5c) close upon picking relay 118 to energize escape magnet 38, in the manner previously described, and thereby disengage the armature to allow the escapement mechanism to continuously escape. During such escapement, emitter wheel 52, acting as a light chopper or shutter, intermittently energizes emitter relay 101 which through contacts 101–2 and AV2 intermittently pick the sequence start relay 105 to verify each column, in the manner previously described, until the end of a field is reached or an error is detected. Should the test TR relay be picked to indicate a high speed error, the detail card is stopped in the column after that in which the error has occurred. The means by which this is accomplished is shown at the bottom of FIG. 5e. Through contact CL6, 101–8, the picking of test relay TR closes contacts TR–2 and picks error detect relay 141. The closing of TR2, through now closed auto skip contact 118–1 and normally closed error–2 contacts 142 energizes the high speed error relays 103 which are then held through high speed error contact 103–4 and contact CL5. As shown in FIG. 5f, the closing of the high speed error relay 103 energizes or closes its contacts 103–5 to energize an indicator lamp 143 which indicates that a high speed error has occurred. Verifier 14 contains suitable means to enable the operator to notch the card in the column in error or to clear the card from the verifier without being notched at all.

Figure 6:
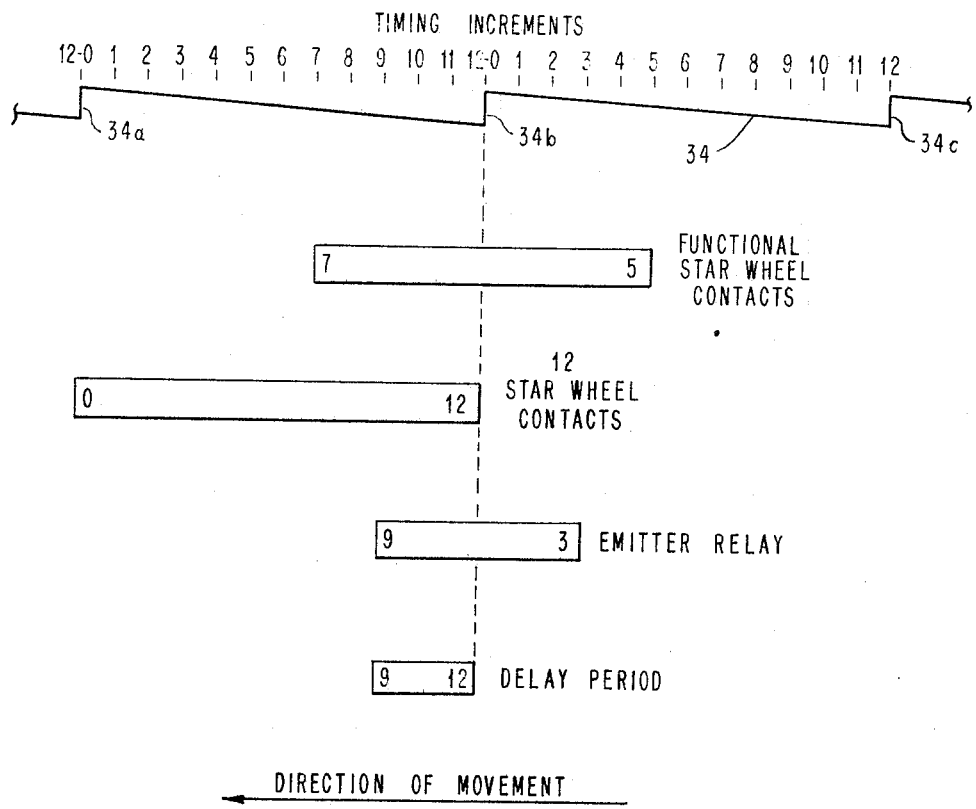
FIG. 6 is a diagram illustrating the timing of the operation of certain elements.

FIG. 6 is a timing illustration using the teeth of escape wheel 34 as the reference, each tooth being divided into twelve equal units. When the escape wheel 34 escapes at eighty columns per second, each unit represents roughly one millisecond. Armature 36 is engageable with faces 34a–34c and when the armature is disengaged, the teeth move in the direction of the arrow, i.e. from the right to the left of FIG. 6. The vertical dotted line aligned with face 34b is considered centered relative to any holes punched in the aligned columns of the master, detail and program cards.

Referring again to FIG. 5e, and with the above timing in mind, it will be seen that as a detail card is advanced and the column that is the first one in the programmed field is moved towards the verify line, contacts STW0 and STW3 close about five milliseconds before the column becomes centered on the line and then the emitter relay picks whereby relay 118 causes the armature to be disengaged to prevent it from stopping the escape wheel. The picking of relay 101 picks the sequence start relay 105 to initiate the time delay drop of relay 104 which drops when the holes are centered on the line. At this point, contacts STW12 close to overlap the closing of STW3 and STW0 to hold the relays AV and 118 throughout the field. Emitter contacts 101–6 are connected in parallel with contacts STW12 through line 138 so that these emitter contacts are closed during the time when STW12 moves to the next hole whereby any contact bounce of contacts STW12, at this time, would not drop the relays being held thereby.

FIG. 5f shows the previously mentioned interlock that prevents operation of keyboard 26. Relay 102 is connected in series with the normally closed contacts VD4, AV4 and 118–4 so that whenever relays VD, AV or 118 are picked, relay 102 is dropped.

In summary, the use of flexible fiber optic bundles permits mounting the single light source, lamp 72, at a location where it is not subject to vibration. Such an arrangement is highly advantageous since vibration is a principal cause of premature lamp failure. Another advantage of this remote lamp location is that light is transmitted by the fiber optics without transmitting any appreciable amount of heat. Therefore, the required light intensity can be furnished to the phototransistors without the deleterious effect of heat, and this makes it possible to cause sufficient current to flow in the phototransistor circuits so that the relays can be operated directly without intervening amplification.

Additionally, a record card is not entirely opaque; the paper material is translucent and has a hole to no-hole light transmissivity ratio of approximately eight-to-one. While such a ration is adequate to guarantee that a relay will be energized only while a hole is sensed, it is not adequate to insure that a relay, once picked, will be dropped as the hole moves away. This problem is obviated in the invention by the emitter wheel which is totally opaque and is used to drop the read and verify relays and thereby provides a high signal to noise ratio.

While the invention has been particularly shown and described with reference to a preferred embodiment thereof, it will be understood by those skilled in the art that various changes in form and detail may be made therein without departing from the spirit and scope of the invention.

What is claimed is:

1. In a record card machine having at least one reading station and transport means adapted to move a record card through said station, the combination of:
   a plurality of phototransistors at said station;
   light source means arranged to selectively activate said phototransistors in accordance with data on said record card;
   a plurality of relays connected to said photo-transistors and adapted to be selectively energized in response to and in accordance with the selective activation of said phototransistors;
   a plurality of hold contacts connected in parallel with said phototransistors for holding said relays independent of the intensity of the light activating said phototransistors;
   switch means adapted to connect said phototransistors and hold contacts to a source of power for operating said relays;
   and timing means for activating said switch means in synchronism with movement of said record card.

2. The combination of claim 1 wherein said timing means comprises a light sensor adapted to sense light from said light source means, and an emitter moved in synchronism with movement of said record card to control the transmission of light to said light sensor.

3. The combination of claim 2 wherein said record card machine includes a program drum for programming automatic functions, and said emitter is connected to said program drum for movement therewith.

4. The combination of claim 3 wherein said light source means comprises a single lamp located remotely from said phototransistors and said light sensor, and a plurality of flexible fiber optic bundles operative to conduct light from said lamp and project such light towards said phototransistors and said light sensor.

5. In a record card machine, the combination of:
   a stand;
   a card handling mechanism comprising card transport means for moving record cards through a reading station;
   means resiliently mounting said card handling mechanism on said stand whereby said stand is substantially unaffected by vibrations due to said mechanism;
   sensing means for reading data from a record card at said station and including a plurality of phototransistors located at said station;
   a single light source mounted on said stand;
   flexible elongated fiber optic light conductor means for conducting light from said source and directing it towards said phototransistors in such a manner that data on a record card controls the amount of light reaching said phototransistors;
   a plurality of relays connected to said phototransistors;
   and circuit means adapted to bias said phototransistors to actuate said relays in accordance with the amount of light received by said phototransistors.

6. In a card verifier having a verify station, a read station and card transport means for moving punched cards through said stations, the combination of:
   a plurality of read relays;
   a plurality of verify relays;
   verifying means responsive to said read and verify relays for controlling said card transport means;
   light conducting means adapted to project light through said punched cards in alignment with rows therein, at said stations;
   a plurality of verify and read phototransistors connected to said verify relays and said reed relays, said phototransistors being responsive to light from said conducting means for selectively picking said relays in accordance with the presence of punched holes in said punched cards;
   holding means operative to hold any picked relays;
   and electro-optical timing means for rendering said holding means inoperative, to thereby drop any picked relays independently of said phototransistors.

7. In a card verifier having a read station at which data can be read from a punched master card, a keyboard for generating data, a verify station at which data can be read from a punched detail card and compared with the data from said keyboard or said master card, card transport means for moving said detail and master cards through said stations selectively in either intermittent or continuous fashion, and program means, including a program drum moved in synchronism with the movement of said cards, for controlling at least one automatic machine function, the combination of:
   an emitter wheel connected to said program drum for movement therewith, said emitter wheel having a series of slots corresponding in number to the columns of a card;
   a first light sensor disposed adjacent to said emitter wheel and being responsive to light transmitted through said slots to generate control pulses for controlling operation of said verifier;
   a plurality of verify phototransistors arranged at said verify station in a line that extends transversely of the path of movement of said detail card, said phototransistors each being responsive to light transmitted through a punched hole for reading data from said detail card on a column-by-column basis;
   a plurality of read phototransistors arranged at said read station in a line that extends transversely of the path of movement of said master card, said read phototransistors each being responsive to light transmitted through a punched hole for reading data from said master card on a column-by-column basis;
   a light source remote from said stations and said emitter wheel;
   and a plurality of flexible fiber optic bundles for transmitting light from said source to said stations and to said emitter wheel for operating said light sensor and said phototransistors.

8. The combination of claim 7 wherein each fiber optic bundle associated with a station has a single input end receiving light from said source and a plurality of output ends arranged in a line so as to project the light emerging therefrom towards said phototransistors and through the path of travel of a card.

9. The combination of claim 7 and including:
   a plurality of read relays connected to be picked by said read phototransistors in response to irradiation thereof by light transmitted through punched holes in said master card;
   a plurality of verify relays connected to be picked by said verify phototransistors in response to irradiation thereof by light transmitted through punched holes in said detail card;
   and means responsive to said control pulses for controlling the dropping of any read and verify relays which have been picked.

10. The combination of claim 7 wherein said program means includes a star wheel sensing device having contacts for holding said automatic machine function throughout a field defined by punched holes in a program card, said contacts being subject to contact bounce at periodic intervals;
    and said verifier further includes contact means connected in parallel with said contacts and operative in response to said control pulses to prevent premature interruption of said autmotaic machine function during said periodic intervals.

11. In a program controlled record card machine, the combination of:

selectively operable first means for controlling a machine function;

first star wheel contact means for initiating operation of said first means to thereby initiate said machine to thereby initiate said machine function;

second star wheel contact means for contitnuing operation of said first means to therby hold said machine function. said second star wheel means being subjected to contact bounce at periodic intervals;

and supplemental holding means comprising contact means connected in parallel with said second star wheel contact means and timing means operative to acuate said contact means of said supplemental holding means during said periodic intervals to thereby provide an alternate hold path so as to prevent premature interruption of said machine function due to said contact bounce.

12. In a program controlled record card machine having a program drum that is moved in synchronism with movement of record cards through said machine and is adapted to support a program card having at least one control hole for initating a machine function and a series of field definition holes in successive columns for holding said function for as long as said field definition holes are in successive columns, the combination of;

a star wheel sensing device responsive to said holes and including a field definition star wheel sensor adapted to move along said series of field definition holes in a hole-to-hole fashion, and field definition star wheel contact means for controlling the holding of said machine function, said field definition star wheel contact means being subject to contact bounce as said star wheel sensor moves between holes;

contact means connected in parallel with said field definition star wheel contact means for establishing a parallel hold path;

and actuating means operated in synchronism with movement of said program drum for actuating said contact means during those periods when said star wheel sensor moves from one hole to the next, to prevent premature interruption of said machine function due to said field definition star wheel contact bounce.

13. The combination of claim 12 wherein said program drum is mounted on a program drum shaft;

and said actuating means comprises an emitter wheel mounted on said shaft in predetermined angular relationship to said program drum, said emitter wheel begin opaque and having a plurality of slots corresponding to the columns of said program card, said actuating means further comprising light source means adapted to project light on said emitter wheel whereby said slots permit said light to pass through said wheel, and means including a light sensor responsive to light passing through said emitter wheel, for actuating said contact means.

14. The combination of claim 13 wherein said machine function is dependent on data in said record card, and said machine further comprises a reading station through which said record cards are moved and said data is read therefrom, said machine further comprising means actuated by said light sensor for timing said reading and said machine function.

References Cited

UNITED STATES PATENTS

| | | | |
|---|---|---|---|
| 1,751,584 | 3/1930 | Hansell | 178—6.7 |
| 2,615,333 | 10/1952 | Gardinor et al. | __235—61.7 XR |
| 2,921,736 | 1/1960 | Hatherell et al. | 235—61.115 |
| 2,976,724 | 3/1961 | Maloney et al. | 73—156 |

LOUIS R. PRINCE, Primary Examiner

J. NOLTON, Assistant Examiner

U.S. Cl. X.R.

178—6; 235—61.7